(12) United States Patent
Lee (10) Patent No.: US 6,332,010 B1
(45) Date of Patent: Dec. 18, 2001

(54) SYNCHRONIZING SIGNAL DETECTING CIRCUIT

(75) Inventor: Doo Hee Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/141,607

(22) Filed: Aug. 28, 1998

(30) Foreign Application Priority Data

Aug. 29, 1997 (KR) ................................................ 97-42891

(51) Int. Cl.[7] .................................................... H04L 7/00
(52) U.S. Cl. ............................................................ 375/368
(58) Field of Search ..................................... 375/368, 365, 375/354, 340; 360/50, 55; 369/47

(56) References Cited

U.S. PATENT DOCUMENTS

| | | | |
|---|---|---|---|
| 4,275,466 | 6/1981 | Yamamoto | 375/368 |
| 5,420,730 | * 5/1995 | Moon et al. | 360/77.08 |
| 5,422,760 | * 6/1995 | Abbott et al. | 360/46 |
| 5,677,935 | * 10/1997 | Karino | 375/368 |
| 5,696,867 | * 12/1997 | Lee | 386/46 |
| 5,886,654 | * 3/1999 | Ichikawa et al. | 341/94 |
| 6,069,855 | * 5/2000 | Fuma et al. | 369/47 |

\* cited by examiner

Primary Examiner—Tesfaldet Bocure (57) ABSTRACT

A synchronizing signal detecting circuit is disclosed. The sycnhronizing signal detecting circuit is characterized in that full matching or n mismatching is determined depending on a sub code area, a main data area, and the state of a system. Input data are compared with a predetermined synchronizing pattern and then a synchronizing signal is detected depending on the determined matching degree. As a result, since the synchronizing signal is detected, it is possible to minimize the missing synchronizing signal. The synchronizing signal detected in error is primarily removed using the window signal and the remaining synchronizing signal detected in error is finally removed by the error flag signal err_flag output as a result of ID ECC. Therefore, the actual synchronizing signal and the forcible synchronizing signal do not occur simultaneously, so that error detection of the synchronizing signal can be minimized. Furthermore, since the window area is varied depending on the state of the system, the sub code area, the main data area, each initial area of each area, and the other areas, it is possible to minimize the missing synchronizing signal. In addition, since the data are realigned and output in parallel, the accurate data can be output even if data slip occurs, thereby preventing error operation.

33 Claims, 7 Drawing Sheets

SYNCHRONIZING SIGNAL DETECTING CIRCUIT

BACKGROUND OF THE INVENTION

1 Field of the Invention

The present invention relates to a data recording/reproducing apparatus, and more particularly, to a synchronizing signal detecting circuit for detecting a synchronizing signal variably depending on the state of a system.

2. Discussion of the Related Art

Generally, a synchronizing pattern of bit streams predetermined by serial data during recording acts as a major factor in detecting a synchronizing signal. If the synchronizing pattern is damaged by breakage of a tape, degradation of a signal, error of drum rotation speed and the like, it is difficult to detect the synchronizing signal. In other words, for these reasons, error may occur in the synchronizing pattern and a data pattern. Thus, the data pattern may be detected in a synchronizing pattern form or the number of clocks between each synchronizing pattern may be inconsistent. As a result, it is not likely to detect the synchronizing signal.

Figure 1:
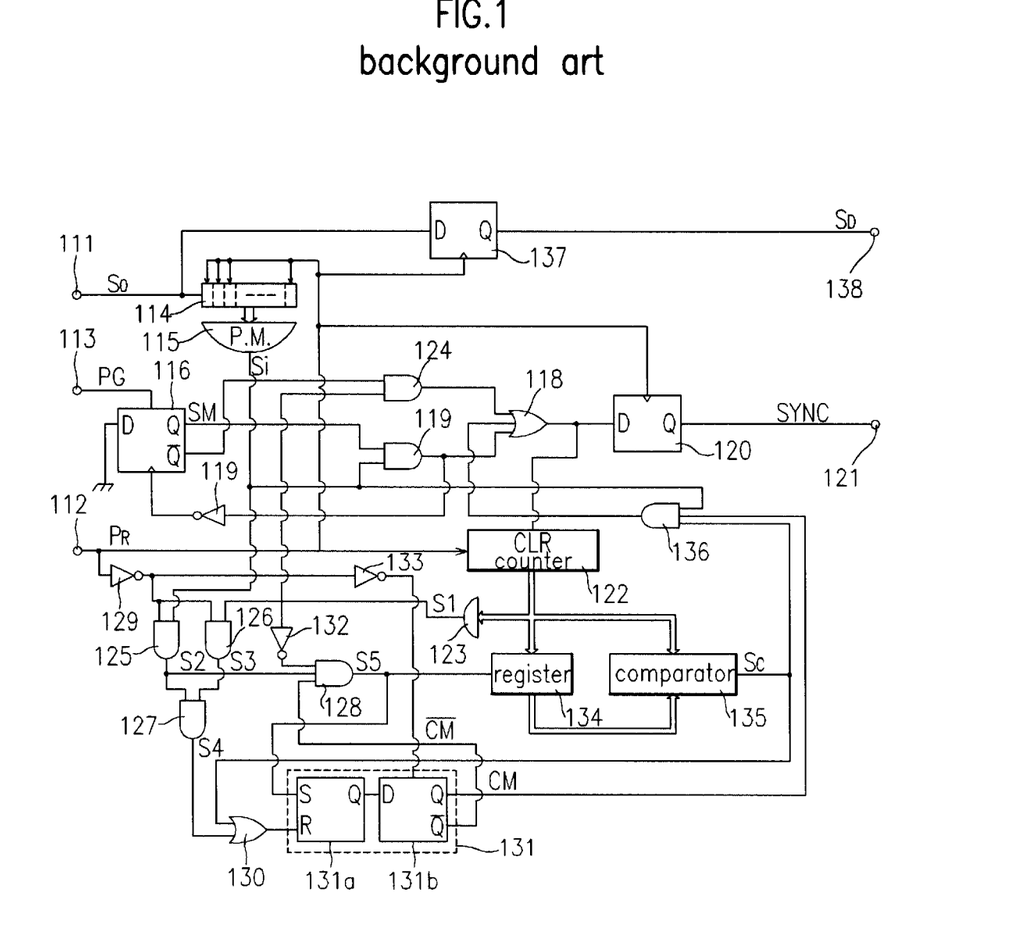
FIG. 1 is a block diagram illustrating a background art synchronizing signal detecting circuit for a magnetic recording/reproducing apparatus.

In this respect, a serial method is widely used as a method for detecting a synchronizing signal. There is provided an example of the serial method in U.S. Pat. No. 4,275,466. FIG. 1 shows configuration of the serial method according to the U.S. Pat. No. 4,275,466.

Referring to FIG. 1, serial input data S0 from an input terminal 111 is input to a synchronizing pattern matching portion 115 through a shift register 114. The synchronizing pattern matching portion 115 generates a detected synchronizing signal Si if the same signal as the synchronizing pattern is input.

A signal PG indicates that a head starts to read a track, and an input signal PR is a reference signal of the system. A signal SM which is a search mode setting signal becomes high if the PG signal is input, while becomes low if the Si signal is first generated after the PG signal is generated, so that the Si signal is acknowledged as the original synchronizing signal.

Furthermore, a synchronizing signal Sync is used as a clear signal of a counter 122 and is counted in the synchronizing block unit. The counter 122 counts the outputs of an OR gate 118 from 0 to N−1 repeatedly. The counted synchronizing signal S1 is searched in an AND gate 123 which will be connected to an output terminal of the counter 122. In other words, the counter 122 serves to forcibly generate the synchronizing signal by counting the outputs of the OR gate 118. If the value of the counter 122 is generated after the first Si signal, the Si signal is acknowledged as the synchronizing signal by the AND gate 124.

A signal CM, which is a check mode signal, becomes high if the detecting synchronizing signal Si differs from the counted signal Si, while becomes low if the output Sc of a comparator 135 is generated. In other words, the CM signal becomes high when the detected synchronizing signal Si is not detected at the position to be detected, while the CM signal becomes low if the Sc signal is generated. Therefore, if the Si signal, the CM signal, and the signal are all high, the Si signal is acknowledged as the final synchronizing signal.

However, the output of the counter 118 results in that the detected synchronizing signal Si and the counted synchronizing signal S1 are all acknowledged as the synchronizing signal. In addition, if the value counted as much as the synchronizing block is identical with the synchronizing signal, the synchronizing signal is acknowledged. Therefore, in the case that the detected synchronizing signal Si and the forcible synchronizing signal S1 occur almost simultaneously as the synchronizing signal is detected in error or inconsistency of the clock between the synchronizing blocks occurs, it is difficult to recognize the original synchronizing signal of the detecting synchronizing signal Si and the forcible synchronizing signal S1, thereby causing erroneous operation.

Furthermore, since the serial data are merely delayed without data alignment, error in data may occur even if the synchronizing signal is normally detected during data slip. This is involved in problems in data processing.

Since only one synchronizing signal pattern in advance is determined regardless of the state of the system and the synchronizing signal is acknowledged only if the synchronizing signal matches the synchronizing signal pattern accurately, it is likely to miss the synchronizing signal.

SUMMARY OF THE INVENTION

Accordingly, the present invention is directed to a synchronizing signal detecting circuit that substantially obviates one or more of the problems due to limitations and disadvantages of the related art.

An object of the present invention is to provide a synchronizing signal detecting circuit for detecting a synchronizing signal by varying matching degree of a synchronizing signal pattern depending on the state of a system.

Another object of the present invention is to provide a synchronizing signal detecting circuit for designating in advance the position where a synchronizing signal will occur using a window and acknowledging only the synchronizing signal within the window as the synchronizing signal.

Other object of the present invention is to provide a synchronizing signal detecting circuit for detecting a synchronizing signal by varying a window area which designates in advance the position of the synchronizing signal.

Still another object of the present invention is to provide a synchronizing signal detecting circuit for acknowledging a final synchronizing signal only if identification (ID) is accurately detected in a synchronizing signal coming in next to the detected synchronizing signal.

Still other object of the present invention is to provide a synchronizing signal detecting circuit for converting input serial data to realigned parallel data and detecting a synchronizing signal so as to prevent erroneous operation from occurring due to clock inconsistency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a synchronizing signal detecting circuit is characterized in that the state of a system is checked during reproducing data recorded in recording media, matching degree of a synchronizing signal pattern is determined depending on the state of the system, and a synchronizing signal is detected from input data in response to the determined matching degree.

In another aspect, a synchronizing signal detecting circuit of the present invention is characterized in that a window signal generator for generating a window signal is provided to acknowledge a synchronizing signal only if a detected synchronizing signal is within a window area and to remove the synchronizing signal detected in error. The window signal generator is characterized in that the window area is varied depending on the state of the system. The window signal generator is characterized in that a window signal is generated to the next synchronizing signal predict area if it is determined that the state of the system is poor. The window signal generator is characterized in that a window area is varied in a sub code area, a main data area, initial areas of the respective areas, and the other areas.

In other aspect, a synchronizing signal detecting circuit of the present invention is characterized in that an ID processor for detecting an ID signal is provided to acknowledge a final synchronizing signal only if the ID signal exists in a synchronizing signal coming in next to the detected synchronizing signal and to remove a synchronizing signal detected in error.

In still another aspect, a synchronizing signal detecting circuit of the present invention is characterized in that the state of the system is checked based on either the number of error flags output from the ID processor or the number of error flags output after inner ECC(error correction code) or outer ECC.

In still other aspect, a synchronizing signal detecting circuit of the present invention is characterized in that full matching (m) or n mismatching (m-n, m<n) of a synchronizing pattern is determined depending on the system check state.

In further aspect, a synchronizing signal detecting circuit of the present invention is characterized in that there are further provided a parallel clock generator for converting serial clocks to parallel clocks and a data realigning portion for realigning serial data using the parallel clocks output from the parallel clock generator or the synchronizing signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2A:
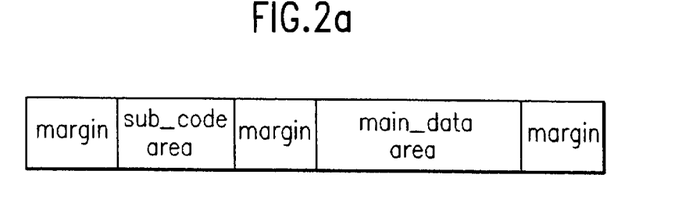
FIG. 2a shows a constitution of data recorded in a track.
Figure 2B:
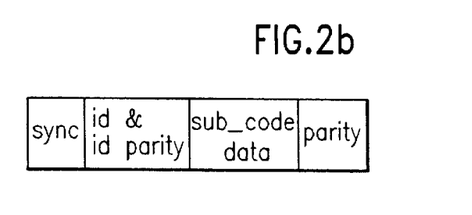
FIG. 2b shows a constitution of a sub synchronizing block.
Figure 2C:
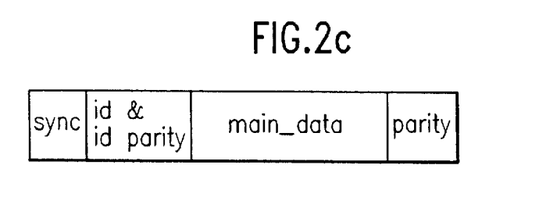
FIG. 2c shows a constitution of a main synchronizing block.

FIGS. 2a to 2c show the constitution of data. FIG. 2a shows a data area recorded in one track. The data area of FIG. 2a includes a sub code area, a main data area, and a margin therebetween. The sub code area, which is an additional area, includes index data, double speed data and the like. The main data area includes picture data constituting a screen. FIG. 2b shows the constitution of a synchronizing block of the sub code area. FIG. 2c shows the constitution of a synchronizing block of the main data area. Each synchronizing block of the sub code area and the main data area includes a synchronizing pattern of 2 bytes, ID of 2 bytes, ID parity of 1 byte, real data(i.e., sub code data or main data), and parity of 8 bytes. The synchronizing pattern of the sub code area is inverse to the synchronizing pattern of the main data area. In other words, supposing that the synchronizing pattern of the sub code area is 1111111100110011, the synchronizing pattern of the main data area becomes 0000000011001100.

Figure 3:
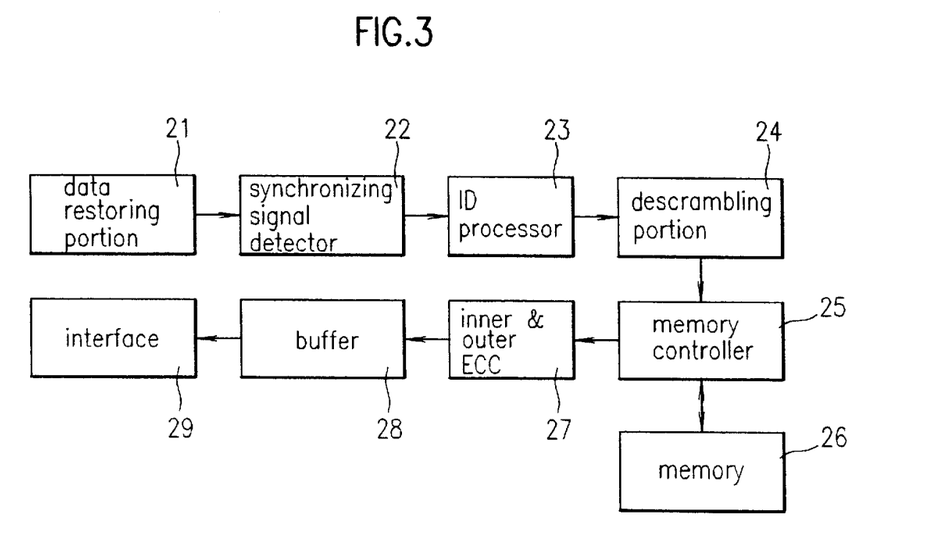
FIG. 3 is a block diagram illustrating a data processing flow during reproduction.

FIG. 3 is a block diagram illustrating a data processing flow during reproduction. The data processing flow during recording is shown in inverse order.

Referring to FIG. 3, data restored by a data restoring portion 21 during reproduction are input to a synchronizing signal detector 22. The synchronizing signal detector 22 detects the synchronizing signal, and realigns the data to be output in parallel. The synchronizing signal detected by the synchronizing signal detector 22 and the realigned data are input to an ID processor 23. The ID processor 23 performs ID detection and ID ECC and then determines a final synchronizing signal in response to the ID detecting result. Then, the ID processor 23 outputs the detected synchronizing signal, ID, and the realigned data to a descrambling portion 24. The descrambling portion 24 restores the data to the original state because a scrambling portion converts data format to an easily recorded form during recording. The data passing through the descrambling portion 24 are stored in a memory 26 through a memory controller 25 for shuffling and then input to an error correction portion 27, so that error correction is performed in a synchronizing block unit and a shuffling unit. The corrected data are output through a buffer 28 and an interface 29.

Figure 4:
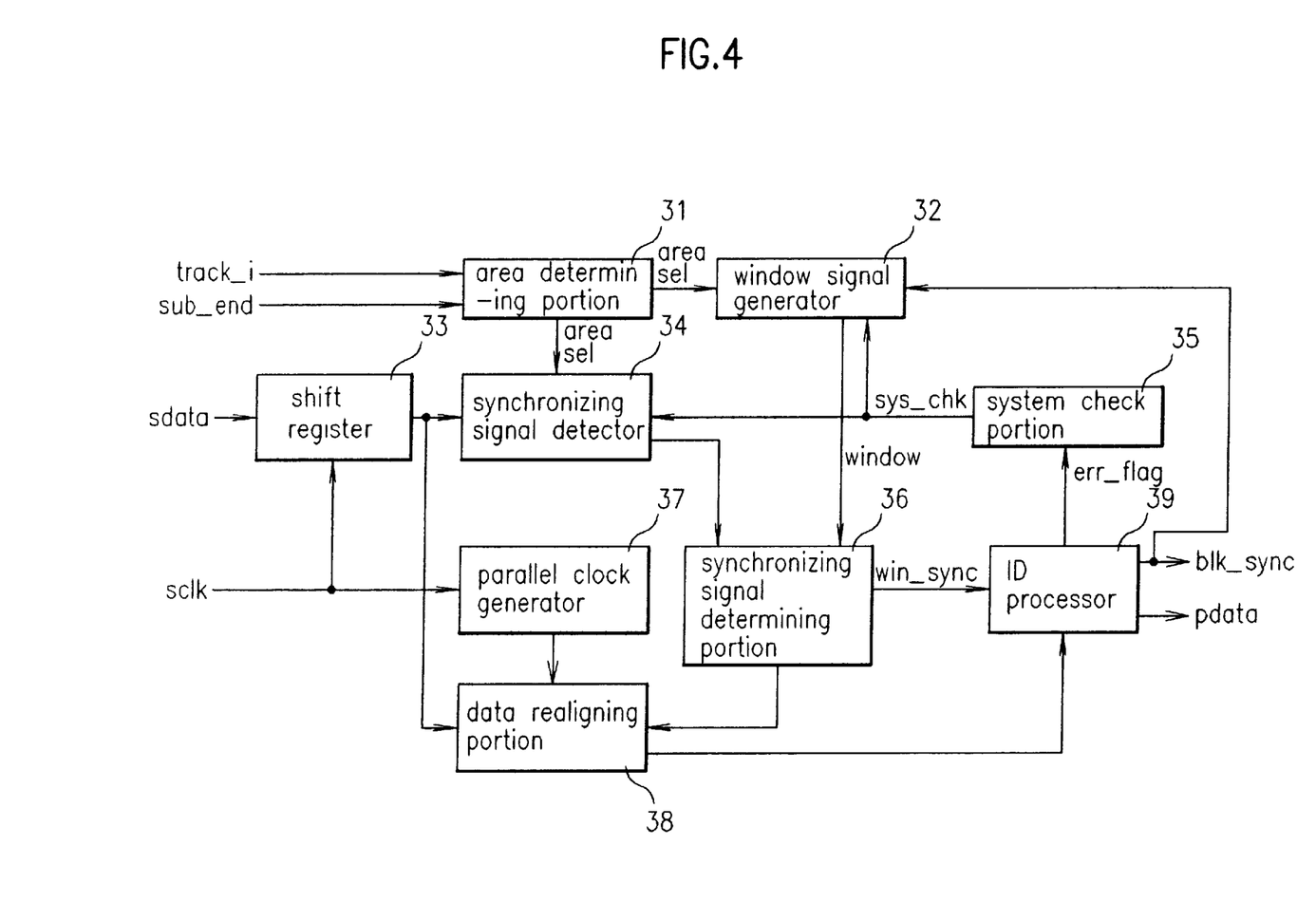
FIG. 4 is a block diagram illustrating a synchronizing signal detecting circuit for a magnetic recording/reproducing apparatus according to the present invention.

FIG. 4 is a block diagram illustrating the synchronizing signal detecting circuit of the present invention.

The synchronizing signal detecting circuit of the present invention includes an area determining portion 31, a shift register 33, a system check portion 35, a window signal generator 32, a synchronizing signal detector 34, a synchronizing signal determining portion 36, a parallel clock generator 37, a data realigning portion 38, and an ID processor 39.

The area determining portion 31 determines the sub code area or the main data area using a track start signal track_i and a sub end signal sub_end indicative of the end of the sub code area, and outputs a control signal area sel capable of discriminating these areas. The shift register 33 shifts input data sdata. The system check portion 35 checks the state of the system and outputs the results sys_chk. The window signal generator 32 generates a window signal variably to the predict position where a synchronizing signal will be generated in response to the control signal area sel of the area determining portion 31, the system check signal sys_chk of the system check portion 35, and a final synchronizing signal blk_sync. The synchronizing signal detector 34 detects a synchronizing signal from data output from the shift register 33 in response to the control signal area sel of the area determining portion 31 and the system check signal sys_chk of the system check portion 35. The synchronizing signal determining portion 36 acknowledges the synchronizing signal only if the synchronizing signal detected by the synchronizing signal detector 34 is within a window area of the window signal generator 32, and primarily removes the synchronizing signal detected in error. The parallel clock generator 37 generates parallel clocks using serial clocks sclk input during reproduction. The data realigning portion 38 realigns data output from the shift register 33 using the synchronizing signal output from the synchronizing signal determining portion 36 or the parallel clocks output from the parallel clock generator 37. The ID processor 39 detects ID from data output from the data realigning portion 38 to perform ID ECC and then acknowledges the synchronizing signal output from the synchronizing signal determining portion 36 only if the ID is detected. Thus, the ID processor 39 finally removes the synchronizing signal detected in error and outputs the synchronizing signal together with the realigned data pdata. The synchronizing signal blk_sync finally acknowledged by the ID processor 39 is also output to the window signal generator 32. Instead of the final synchronizing signal blk_sync, the synchronizing signal win_sync determined by the synchronizing signal determining portion 36 may output to the window signal generator 32. The track start signal track_i may be generated using either a head switching pulse or a signal PG indicating that a head starts to read a track. The track start signal track_i may be externally applied. Furthermore, the sub end signal sub_end indicative of the end of the sub code area may be generated either by counting the synchronizing block or using the ID of the ID processor 39. Alternatively, the sub end signal sub_end may be generated by detecting the margin pattern of the main data area as shown in FIG. 2a or may be externally applied.

In the aforementioned synchronizing signal detecting circuit of the present invention, the area determining portion 31 determines the main data area or the sub code area using the track start signal track_i and the sub end signal sub_end, and outputs the control signal area sel capable of discriminating these areas to the window signal generator 32 and the synchronizing signal detector 34. The shift register 33 synchronizes the input serial data sdata to the serial clock sclk, and outputs them to the synchronizing signal detector 34 and the data realigning portion 38 sequentially shifts them.

The synchronizing signal detector 34 will be described in detail with reference to FIG. 5.

Figure 5:
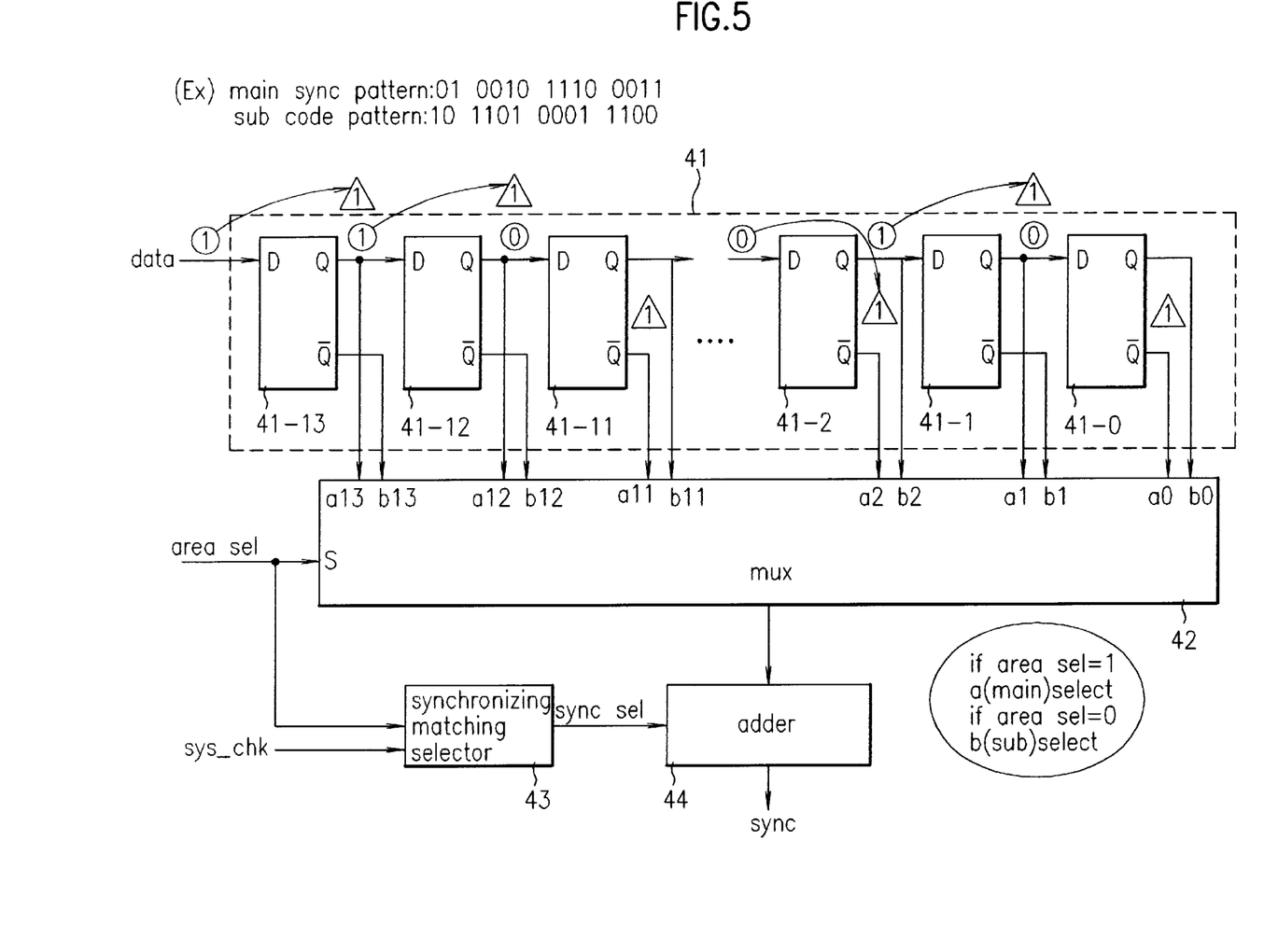
FIG. 5 is a detailed block diagram illustrating a synchronizing signal detector of FIG. 4.

As shown in FIG. 5, the synchronizing signal detector 34 includes a synchronizing pattern determining portion 41, a multiplexer 42, a synchronizing matching selector 43, and an adder 44. The synchronizing pattern determining portion 41 outputs "1" through a main output terminal if input data consisting of a plurality of flip-flops 41-0~41-13 match a preset main synchronizing pattern, and outputs "1" through a sub output terminal if they match a sub synchronizing pattern. The multiplexer 42 selectively outputs data a0~a13 input through the main output terminal of the synchronizing pattern determining portion 41 if the data is in the main data area in response to the control signal area sel output from the area determining portion 31, while selectively outputs data b0~b13 input through the sub output terminal of the synchronizing pattern determining portion 41 if the data is in the sub code area in response to the control signal area sel output from the area determining portion 31. The synchronizing matching selector 43 determines matching degree of the synchronizing pattern in response to the control signal area sel output from the area determining portion 31 and the system check signal sys_chk output from the system check portion 35. The adder 44 adds the number of "1" output from the multiplexer 42, determines the presence of the synchronizing signal in response to a matching select signal sync sel indicative of matching degree of the synchronizing pattern output from the synchronizing matching selector 43, and outputs the synchronizing signal.

Each of the flip-flops 41-0~41-13 in the synchronizing pattern determining portion 41 is provided as much as the number of bits constituting the synchronizing pattern. As an example, there are provided 14 flip-flops in the present invention. Since each of the flip-flops is set to match the main synchronizing pattern and the sub synchronizing pattern, it outputs "1" through the main output terminal and outputs "0" through the sub output terminal if the input data match the main synchronizing pattern. On the other hand, each of the flip-flops outputs "0" through the main output terminal and outputs "1" through the sub output terminal if the input data match the sub synchronizing pattern. In other words, the main synchronizing pattern is output through the main output terminal while the sub synchronizing pattern is output through the sub output terminal. The main output terminal of each flip-flop is connected with a terminals a0~a13 of the multiplexer 42 and its sub output terminal is connected with b terminals b0~b13 of the multiplexer 42.

For example, it is assumed that the synchronizing pattern of the main data area is 01 0010 1110 0011 and the synchronizing pattern of the sub data area is 10 1101 0001 1100. In this case, each of flip-flops 41-0~41-13 outputs 11 1111 1111 1111 through the main output terminal if the input data is 01 0010 1110 0011. In other words, the data in ○ of FIG. 5 represent data prior to clock input and the data in Δ represent data "1" output through the main output terminal in case where the data in ○ is identical with the synchronizing pattern of the main data area. Therefore, if the input data is 01 0010 1110 1100, 11 1111 1111 0000 is output through the main output terminal and 00 0000 0000 1111 is output through the sub output terminal. Likewise, if the input data is identical with the synchronizing pattern of the sub data area, the sub output terminal of each flip-flop outputs "1" to b input terminals b0~b13 of the multiplexer 42.

The multiplexer 42 selects signals input through the a input terminals a0~a13 if the area determining portion 31 determines the main data area in response to the control signal area sel. While, the multiplexer 42 selects signals input through the b input terminals b0~b13 if the area determining portion 31 determines the sub code area. Then, the multiplexer 42 outputs the selected signals to the adder 44.

The adder 44 adds the number of "1" output from the multiplexer 42 and determines whether or not input data by the added number of "1" are the synchronizing signal. If it is determined that the input data are the synchronizing signal, the adder 44 outputs the synchronizing signal sync. At this time, full matching (m) and n mismatching (m−n) can be generated in response to the number of "1" added by the adder 44 (where, m>n). The full matching and the n mismatching are determined by the synchronizing select signal sync sel generated by the synchronizing matching selector 43 depending on the system check signal sys_chk and the area control signal area sel. In other words, the synchronizing matching selector 43 determines matching degree of the synchronizing pattern in the adder 44 in response to the area or the state of the system. The full matching means that the input data match the synchronizing pattern completely. The n mismatching means that the input data do not match the synchronizing pattern by n. In either case, the synchronizing signal is acknowledged. That is, the synchronizing signal is acknowledged even though the input synchronizing pattern is damaged by breakage of a tape, degradation of a signal, error of drum rotation speed and the like.

At this time, the synchronizing matching selector 43 determines the matching degree. In other words, the synchronizing matching selector 43 determines the full matching or the n mismatching in response to the control signal area sel output from the area determining portion 31 and the system check signal sys_chk output from the system check portion 35, and outputs the corresponding synchronizing select signal sync sel to the adder 44. The matching degree is determined by the sub code area, the main data area, and the state of the system. For example, it is assumed that the signal line output from the synchronizing matching selector 43 is 2 bits. In this case, if the output signal is 00, it is determined as the full matching. If the output signal is 01, it is determined as 1 mismatching. If the output signal is 10, it is determined as 2 mismatching. If the output signal is 11, it is determined as 3 mismatching. In addition, it is assumed that the synchronizing pattern is 14 bits. In this case, if the synchronizing matching selector 43 outputs 01 and the number of "1" added by the adder 44 is 13 (that is, only 1 bit is wrong), the synchronizing signal is acknowledged and thus generated. At this time, the synchronizing matching selector 43 initially performs the full matching and then performs the n mismatching according to circumstances. Alternatively, the synchronizing matching selector 43 may initially perform the n mismatching.

Meanwhile, the system check portion 35 can check the system through error flags err_flag output from the ID processor 39. For example, the system check portion 35 can check the state of the system based on the number of error flags err_flag output from the ID ECC in the unit of n track or shuffle. Alternatively, the system check portion 35 can check the state of the system through the state of error flags err_flag output after inner ECC or outer ECC.

The synchronizing signal detected by the synchronizing signal detector 34 is primarily filtered by the window signal in the synchronizing signal determining portion 36. The window signal is output from the window signal generator 32. The size of the window is varied depending on the occasions. The window is generally divided into a sub area window and a main area window. Each of the sub area window and the main area window is divided into an initial window and the other window. The reason why the size of the window is varied is that the margin between the track start position and the sub code area start position, the margin between the end of the sub code area and the start of the main data area, and the margin between the end of the main data area and the end of the track differ from one another, as shown in FIG. 2.

Figure 6:
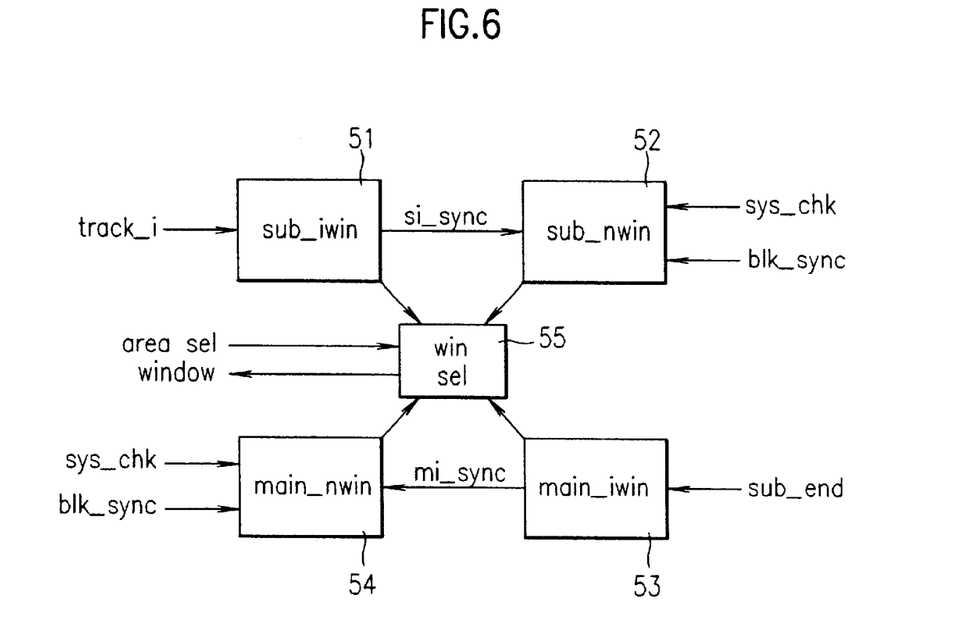
FIG. 6 is a detailed block diagram illustrating a window signal generator of FIG. 4.

Furthermore, the size of the window is varied depending on the state of the system. In other words, as shown in FIG. 6, a first window signal generator 51 of the window signal generator 32 generates an initial window signal of the sub code area based on the track start signal track_i, and outputs the same to the window signal selector 55 and at the same time outputs a first sub synchronizing signal si_sync to a second window signal generator 52 of the window signal generator 32. The second window signal generator 52 generates the window signal of the sub code area based on the first sub synchronizing signal si_sync and output the same to the window signal selector 55. At this time, the second window signal generator 52 varies the size of the window of the sub code area in response to the system check state of the system check portion 35 and the final synchronizing signal blk_sync. If the system check result is good, the second window signal generator 52 generates a fixed sized window of the sub code area in a predict area where the synchronizing signal will be generated. While, if not, the second window signal generator 52 increases the size of the window because it is likely to cause error in the synchronizing signal. For example, if the system check result of the system check portion 35 is poor, the second window signal generator 52 continues to open the window to the next synchronizing signal predict area and generates the window of the sub code area in the next synchronizing signal predict area after the complete synchronizing signal is detected. This is useful to high speed search. If the fixed sized window is generated when the synchronizing pattern occurs in a wrong position due to burst error and the like, the window is not generated in a position where the actual synchronizing signal is, thereby making difficult to search the accurate synchronizing signal.

Meanwhile, a third window signal generator 53 generates an initial window signal of the main data area based on the sub end signal sub_end indicative of the end of the sub code area, and outputs the same to the window signal selector 55 and at the same time outputs a first main synchronizing signal mi_sync to a fourth window signal generator 54. The sub end signal sub_end may be generated by counting the synchronizing block or using ID of the ID processor 39. Alternatively, as shown in FIG. 2, the sub end signal sub_end may be generated by detecting the margin pattern of the main data area or may externally be applied.

The fourth window signal generator 54 generates the window of the main data area based on the first main synchronizing signal mi_sync and outputs the same to the window signal selector 55. At this time, the fourth window signal generator 54 varies the size of the window in response to the system check signal sys_chk and the final synchronizing signal blk_sync. The reason why the fourth window signal generator 54 varies the size of the window is the same as the second window signal generator 52. If the system check result is not poor, the initial window signal of the sub code area and the initial window signal of the main data area are wider than the other window signals, and the main window signal is wider than the sub window signal.

The window signal selector 55 selects one of the window signals generated by the first to fourth window signal generators 51~54 in response to the control signal area sel output from the area determining portion 31, and outputs the same to the synchronizing signal determining portion 36.

The synchronizing signal determining portion 36 acknowledges the synchronizing signal if the synchronizing signal generated by the synchronizing signal detector 34 is within the window area from the window signal generator 32. While the synchronizing signal determining portion 36 does not acknowledge the synchronizing signal if not. Therefore, the synchronizing signal detected in error by the synchronizing signal detector 34 is primarily removed by the synchronizing signal determining portion 36. Only the synchronizing signal acknowledged by the synchronizing signal determining portion 36 is output to the data realigning portion 38 and the ID processor 39.

Meanwhile, the parallel clock generator 37 converts serial clocks sclk to parallel clocks and outputs them to the data realigning portion 38.

The data realigning portion 38 converts the serial data input through the shift register 33 to the parallel data depending on the parallel clocks generated by the synchronizing signal. Alternatively, the data realigning portion 38 may output the parallel data of 1 byte per 8 bits if the synchronizing signal from the synchronizing signal determining portion 36 is input.

Figure 7:
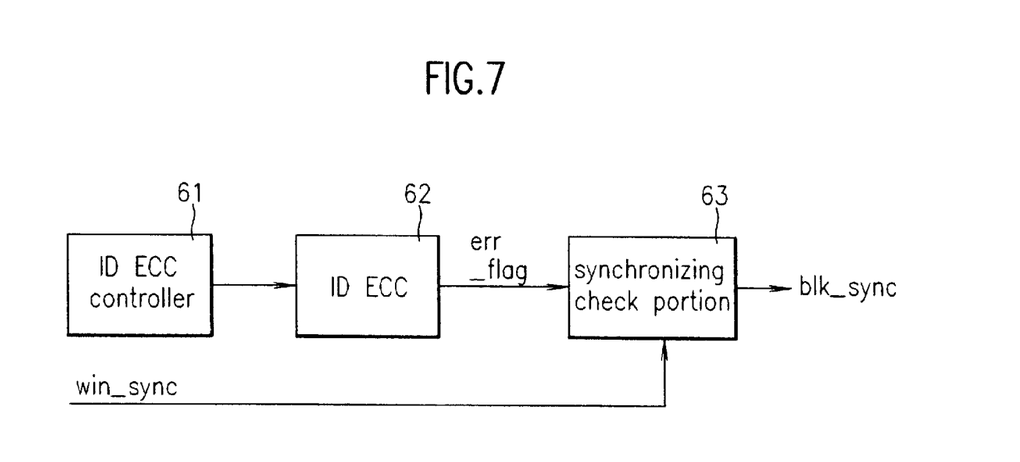
FIG. 7 is a detailed block diagram illustrating an ID processor of FIG. 4.

Meanwhile, FIG. 7 is a detailed block diagram of the ID processor 39. An ID ECC 62 of the ID processor 39 detects ID from the parallel data pdata input through an ID ECC controller 61 and performs ID ECC. As a result, the ID ECC 62 outputs error flags err_flag to the system check portion 35 and a synchronizing signal check portion 63. The synchronizing signal check portion 63 finally determines whether the synchronizing signal win_sync primarily filtered by the synchronizing signal determining portion 36 is right or wrong in response to the state of error flags err_flag. In other words, only if the ID is detected after the synchronizing signal win_sync output from the synchronizing signal determining portion 36 is generated, the final synchronizing signal blk_sync is acknowledged. Since the synchronizing pattern accompanies with ID necessarily as shown in FIG. 2, if the ID is not detected after the synchronizing signal win_sync primarily filtered by the synchronizing signal determining portion 36, it is regarded that the synchronizing signal win_sync primarily filtered by the synchronizing signal determining portion 36 is detected in error.

Figure 8:
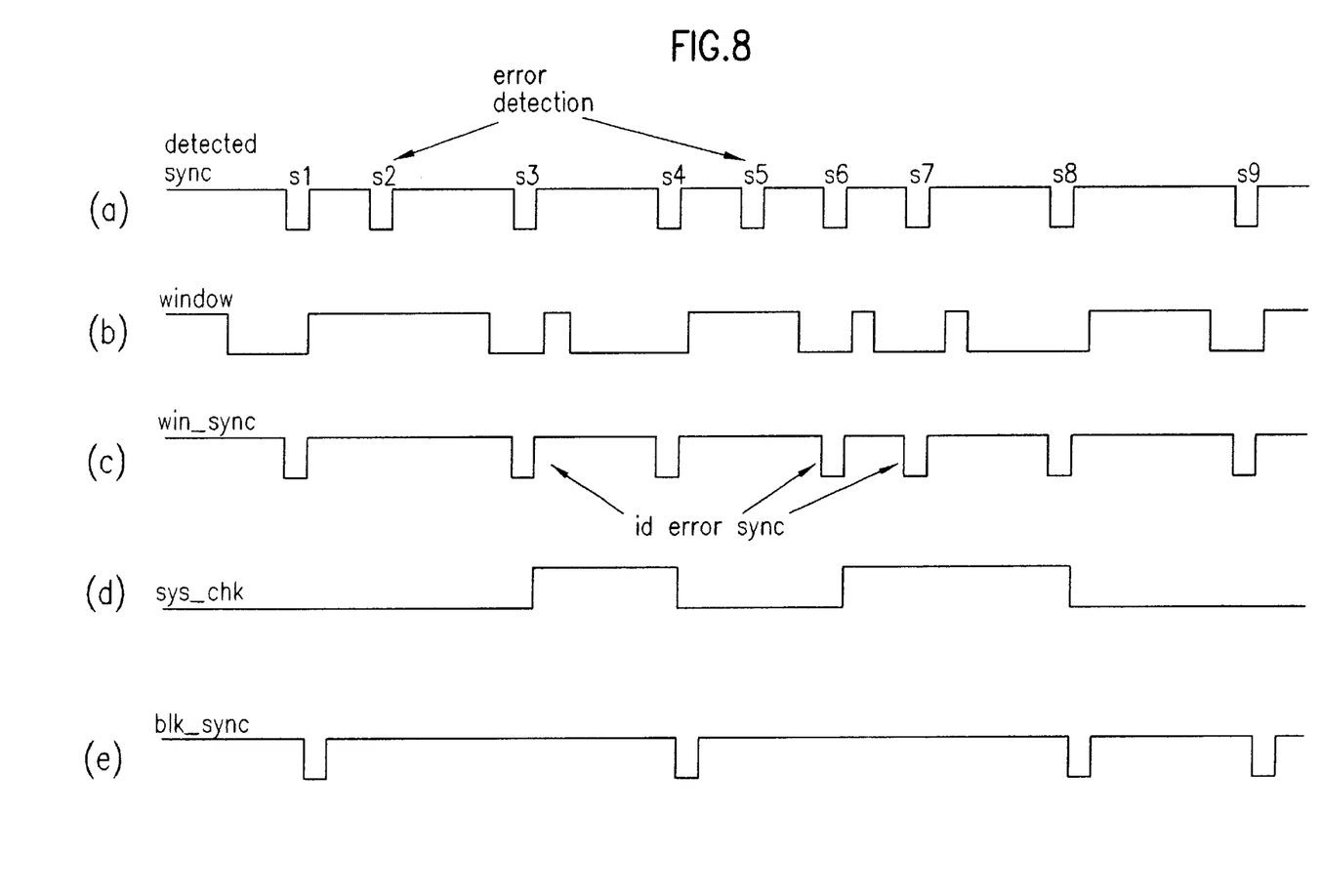
FIGS. 8a to 8e are waveforms of respective elements illustrating variation in the size of a window of FIG. 4.

FIGS. 8a to 8e are waveforms illustrating variation in the size of the window generated by the window signal generator 32. FIG. 8a shows waveforms of the synchronizing signal detected by the synchronizing signal detector 34, in which s1, s4, s8 and s9 are actual synchronizing signals, s2 and s5 are synchronizing signals detected in error, and s3, s6 and s7 are ID error synchronizing signals having no ID coming in next to the synchronizing signal. At this time, the window signal generator 32 determines that the positions s2 and s5 are not the synchronizing signal predict positions and thus does not generate the window as shown in FIG. 8b.

As shown in FIG. 8d, if the system check signal sys_chk is high, it is assumed that the state of the system is poor. The window signal generator 32 generates the fixed sized window (low state) at the position s3 and then closes the same. At this time, since the state of the system is poor as shown in FIG. 8d, the window signal generator 32 generates the window again. The size of the window increases to the next synchronizing signal predict position. The next synchronizing signal predict position may be determined from either the synchronizing signal blk_sync output as shown in FIG. 8e or the synchronizing signal win_sync output as shown in FIG. 8c. Therefore, the next synchronizing signal predict position becomes s4.

Figure 9:
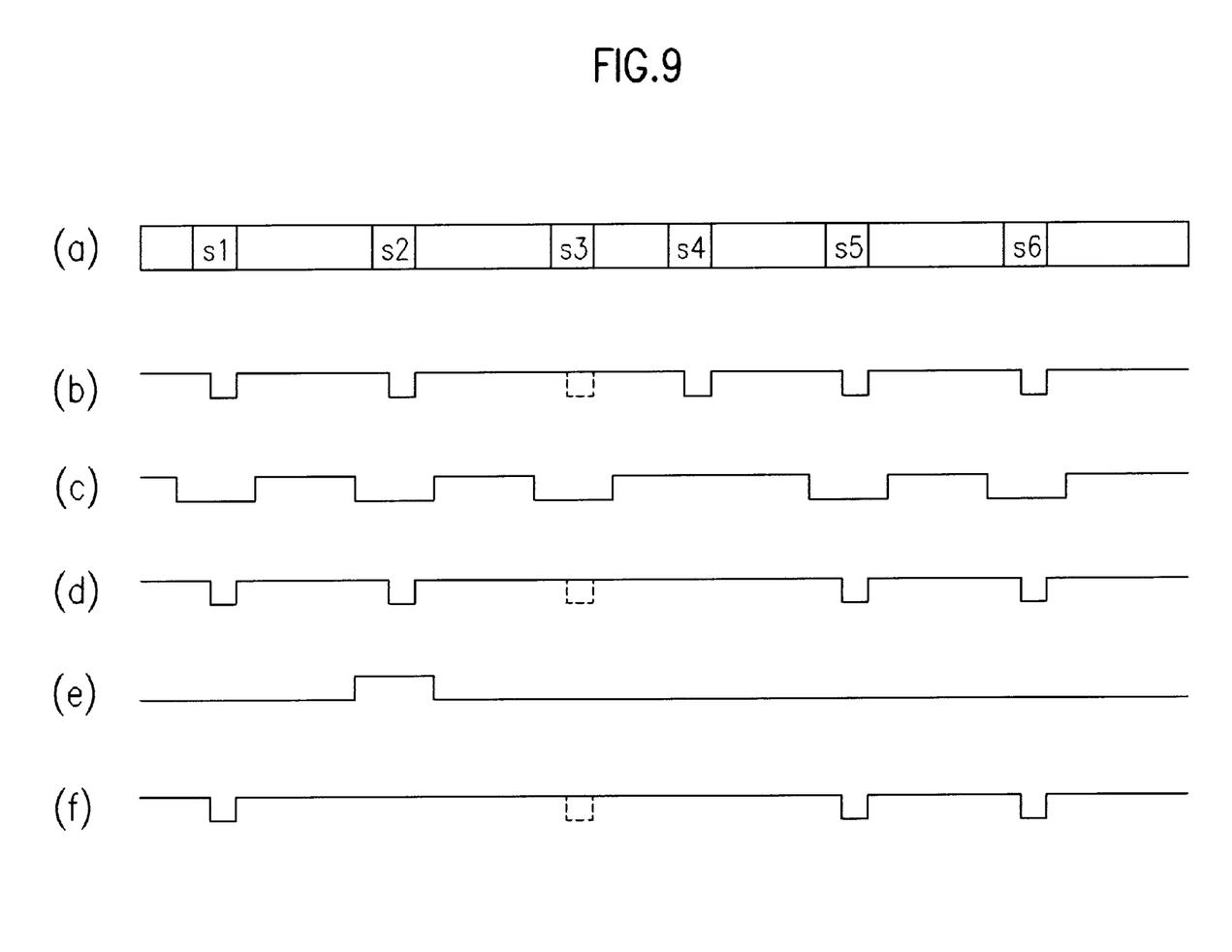
FIGS. 9a to 9f are waveforms of respective elements of FIG. 4.

FIGS. 9a to 9f are waveforms illustrating steps of detecting the aforementioned synchronizing signals. FIG. 9a shows input data, in which s represents the position of the synchronizing signal pattern. s1, s3, s5 and s6 represent the position of the actual synchronizing signal pattern, s3 represents the position of the missing synchronizing signal in case where 1 bit or 2 bits differ from the synchronizing signal pattern in the full matching, s2 represents the position where the data pattern is detected in error in the synchronizing signal pattern form at the data coming in next to the actual synchronizing signal which is missed, and s4 represents the position where the data pattern is detected in error in the synchronizing signal pattern form at the data near the actual synchronizing signal which is missed.

FIG. 9b shows waveforms of the synchronizing signal generated in s1, s2, s4, s5 and s6 by the synchronizing signal detector 34 in case of the full matching. The synchronizing signal is not generated in s3 due to the full matching. FIG. 9c shows window signals generated in the window predict position by the window signal generator 32. FIG. 9d shows the outputs of the synchronizing signal determining portion 36. In other words, since the window signal is generated only in s1, s2, s5 and s6, the synchronizing signal determining portion 36 does not acknowledge the synchronizing signal generated in s4. In addition, since the synchronizing signal detector 34 does not generate the synchronizing signal in s3 even though the window signal is generated in s3, the synchronizing signal determining portion 36 does not acknowledge the synchronizing signal in s3, either. FIG. 9e shows an error flag signal err_flag generated in the ID ECC 62 of the ID processor 39, in which error occurs in high state. In other words, since the ID is not detected in s2, the synchronizing signal generated in s2 is not acknowledged. Therefore, the synchronizing signal check portion 63 acknowledges the synchronizing signal generated in s1, s5 and s6 as shown in FIG. 9f as the final synchronizing signal, in response to the state of the error flag signals err_flag output after ID ECC. The synchronizing signal detected in error is primarily removed using the window signal and the remaining synchronizing signal detected in error is again removed by the result of ID ECC, i.e., the error flag signals err_flag.

Meanwhile, supposing 1 mismatching or 2 mismatching, the synchronizing signal detector 34 generates the synchronizing signal in s3 as shown in a dotted line of FIG. 9b. At this time, since the window signal is generated in s3 as shown in FIG. 9c, the synchronizing signal is acknowledged as shown in FIG. 9d. As shown in FIG. 9e, since error does not occur in the ID signal, the final synchronizing signal is acknowledged as shown in FIG. 9f.

As aforementioned, the synchronizing signal detecting circuit for a magnetic recording/reproducing apparatus according to the present invention has the following advantages.

In the present invention, the full matching or n mismatching is determined depending on the sub code area, the main data area, and the state of the system. The input data are compared with a predetermined synchronizing pattern and then the synchronizing signal is detected depending on the determined matching degree. As a result, since the synchronizing signal is detected, it is possible to minimize the missing synchronizing signal.

The synchronizing signal detected in error is primarily removed using the window signal and the remaining synchronizing signal detected in error is finally removed by the error flag signal err_flag output as a result of ID ECC. Therefore, the actual synchronizing signal and the forcible synchronizing signal do not occur simultaneously, so that error detection of the synchronizing signal can be minimized.

Furthermore, since the window area is varied depending on the state of the system, the sub code area, the main data area, each initial area of each area, and the other areas, it is possible to minimize the missing synchronizing signal.

In addition, since the data are realigned and output in parallel, the accurate data can be output even if data slip occurs, thereby preventing error operation.

It will be apparent to those skilled in the art that various modifications and variations can be made in the synchronizing signal detecting circuit according to the present invention without departing from the spirit or scope of the invention. Thus, it is intended that the present invention covers the modifications and variations of the invention provided they come within the scope of the appended claims and their equivalents.

What is claimed is:

1. A synchronizing signal detecting circuit for detecting a synchronizing signal from reproduced data during reproducing data recorded in recording media, the synchronizing signal detecting circuit comprising:

a system check portion for determining a system state based on results of error correction of input reproduced data;

a comparator for comparing reproduced data with a preset synchronizing pattern;

a synchronizing signal matching selector for determining a matching degree based on the system state, the matching degree indicating a degree that the input reproduced data should match the preset synchronizing pattern; and a synchronizing signal determining portion for determining the input reproduced data as a synchronizing signal based on the matching degree from the synchronizing signal matching selector and the comparison results.

2. The synchronizing signal detecting circuit as claimed in claim 1, further comprising a window signal generator for generating a window signal to acknowledge the synchronizing signal determined by the synchronizing signal determining portion only if it is within a window area of the window signal generator.

3. The synchronizing signal detecting circuit as claimed in claim 2, wherein the window signal generator varies the window area in response to the system state.

4. The synchronizing signal detecting circuit as claimed in claim 3, wherein the window signal generator continues to generate a window signal to a next synchronizing signal predict area if the system state is poor.

5. The synchronizing signal detecting circuit as claimed in claim 2, wherein the window signal generator varies the window area depending on whether the input reproduced data is in at least one of a sub code area and a main data area.

6. The synchronizing signal detecting circuit as claimed in claim 1, further comprising an ID processor for detecting an ID signal, performing error correction, and outputting an error flag value resulting from error correction to the system check portion, the ID processor acknowledging the synchronizing signal determined by the synchronizing signal determining portion only if the ID signal is detected by the ID processor.

7. A synchronizing signal detecting circuit for detecting a synchronizing signal from reproduced data having a sub code area and a main data area during reproducing data recorded in recording media, the synchronizing signal detecting circuit comprising:

an area determining portion for determining the sub code area and the main data area in an input reproduced data;

a system check portion for determining a system state based on results of error correction of the input reproduced data;

a synchronizing signal detector for determining a matching degree based on a system check signal output from the system check portion, the matching degree indicating a degree that the input reproduced data should match the preset synchronizing pattern and detecting a synchronizing signal from input reproduced data in response to the determined matching degree;

a window signal generator for generating a window area based on output of the area determining portion; and a synchronizing signal determining portion for verifying a synchronizing signal only if the synchronizing signal detected by the synchronizing signal detector is within the generated window area; and an ID processor for detecting an ID signal, performing error correction, outputting a number of error flags resulting from the error correction to the system check portion, and acknowledging the verified synchronizing signal output from the synchronizing signal determining portion only if the ID signal is accurately detected.

8. The synchronizing signal detecting circuit as claimed in claim 7, wherein the system check portion determines the system state based on the number of error flags output from the ID processor.

9. The synchronizing signal detecting circuit as claimed in claim 7, wherein the system check portion determines the system state based on the number of error flags per n track (n is a natural number) output from the ID processor.

10. The synchronizing signal detecting circuit as claimed in claim 7, wherein the system check portion determines the system state based on the number of error flags per shuffling output from the ID processor.

11. The synchronizing signal detecting circuit as claimed in claim 7, wherein the system check portion determines the system state based on a number of error flags output after correcting inner error of the input reproduced data.

12. The synchronizing signal detecting circuit as claimed in claim 7, wherein the system check portion determines the system state based on a number of error flags after correcting outer error of the input reproduced data.

13. The synchronizing signal detecting circuit as claimed in claim 7, wherein the track start signal is externally applied.

14. The synchronizing signal detecting circuit as claimed in claim 7, wherein the track start signal is generated by a head switching pulse.

15. The synchronizing signal detecting circuit as claimed in claim 7, wherein the track start signal is generated by a signal for indicating that a head starts to read a track.

16. The synchronizing signal detecting circuit as claimed in claim 7, wherein the sub end signal is generated by counting a synchronizing block.

17. The synchronizing signal detecting circuit as claimed in claim 7, wherein the sub end signal is generated using the ID signal detected by the ID processor.

18. The synchronizing signal detecting circuit as claimed in claim 7, wherein the sub end signal is generated by detecting a margin pattern of the main data area.

19. The synchronizing signal detecting circuit as claimed in claim 7, wherein the synchronizing signal detector includes:

a synchronizing pattern determining portion for outputting a logic signal indicative of matching through each main output terminal if the input reproduced data having a plurality of flip-flops match a preset main synchronizing pattern, and outputting the logic signal through each sub output terminal if the input reproduced data match a sub synchronizing pattern;

a data selector for selecting either data of a main output terminal or data of a sub output terminal in the synchronizing pattern determining portion in response to output from the area determining portion;

a synchronizing signal matching selector for determining the matching degree; and an adder for adding a number of the logic signals having a predetermined state output from the data selector and outputting a synchronizing signal based on the matching degree.

20. The synchronizing signal detecting circuit as claimed in claim 19, wherein the synchronizing signal matching selector determines the matching degree of the synchronizing pattern in based on the system state and the output from the area determining portion.

21. The synchronizing signal detecting circuit as claimed in claim 19, wherein the synchronizing signal matching selector determines full matching (m) or n mismatching (m−n, m>n) of the synchronizing pattern in response to the control signal output from the area determining portion and the system check signal output from the system check portion.

22. The synchronizing signal detecting circuit as claimed in claim 7, wherein the window signal generator includes:

a first window signal generator for generating an initial window of the sub code area based on the track start signal;

a second window signal generator for generating a window signal of the sub code area in a next synchronizing signal predict position based on a first sub synchronizing signal output from the first window signal generator;

a third window signal generator for generating an initial window signal of the main data area based on the sub end signal;

a fourth window signal generator for generating a window signal of the main data area in a next synchronizing signal predict position based on a first main synchronizing signal output from the third window signal generator; and a window signal selector for selecting one of window signals generated by the first to fourth window signal generators in response to the output from the area determining portion.

23. The synchronizing signal detecting circuit as claimed in claim 22, wherein the second window signal generator generates window signals of the sub code area at a different size based on the system state.

24. The synchronizing signal detecting circuit as claimed in claim 22, wherein the fourth window signal generator generates window signals of the main data area at a different size based on the system state.

25. The synchronizing signal detecting circuit as claimed in claim 23, wherein the window signal generator continues to generate window signals to the next synchronizing signal predict area if the system state is poor.

26. The synchronizing signal detecting circuit as claimed in claim 25, wherein the window signal generator determines the next synchronizing signal predict area using the acknowledged synchronizing signal output from the ID processor.

27. The synchronizing signal detecting circuit as claimed in claim 25, wherein the window signal generator determines the next synchronizing signal predict area using the verified synchronizing signal output from the synchronizing signal determining portion.

28. The synchronizing signal detecting circuit as claimed in claim 7, wherein the window signal generator varies the window area depending on whether the input reproduced data is in at least one of the sub code area and the main data area.

29. The synchronizing signal detecting circuit as claimed in claim 7, wherein the ID processor includes:

a controller for controlling ID error correction;

an ID error correction portion for detecting the ID signal from the input reproduced data under the control of the controller, performing error correction of the detected ID signal and outputting an error flag signal; and a synchronizing signal check portion for removing a synchronizing signal detected in error of verified synchronizing signals output from the synchronizing signal determining portion in response to the error flag signal output from the ID error correction portion.

30. The synchronizing signal detecting circuit as claimed in claim 7, further comprising a parallel clock generator for converting input serial clocks to parallel clocks; and a data realigning portion for converting serial data input by the parallel clocks output from the parallel clock generator to parallel data.

31. The synchronizing signal detecting circuit as claimed in claim 30, wherein the data realigning portion outputs serial input data of 1 byte per 8 bits if the verified synchronizing signal output from the synchronizing signal determining portion is input.

32. The synchronizing signal detecting circuit as claimed in claim 7, wherein the area determining portion determines the sub code area and the main data area using a track start signal and a sub end signal, which is indicative of an end of the sub code area.

33. A synchronizing signal detecting circuit for detecting a synchronizing signal from reproduced data having a sub code area and a main data area during reproducing data recorded in recording media, the synchronizing signal detecting circuit comprising:

an area determining portion for determining the sub code area and the main data area in input reproduced data;

a system check portion for determining a system state based on results of error correction of the input reproduced data;

a synchronizing signal detector for determining a matching degree based on a system check signal output from the system check portion, the matching degree indicating a degree that the input reproduced data should match the preset synchronizing pattern and detecting a synchronizing signal from input reproduced data in response to the determined matching degree;

a window signal generator for generating a window area based on output of the area determining portion; and a synchronizing signal determining portion for verifying a synchronizing signal only if the synchronizing signal detected by the synchronizing signal detector is within the generated window area.

* * * * *